(12) United States Patent
Davies et al.

(10) Patent No.: US 9,248,992 B2
(45) Date of Patent: Feb. 2, 2016

(54) APPARATUS AND METHOD FOR CUTTING OUT A VEHICLE GLAZING PANEL

(75) Inventors: Christopher Davies, Kidwelly (GB); William Finck, Essex (GB)

(73) Assignee: Belron Hungary Kft- Zug Branch, Zug (CH)

( * ) Notice: Subject to any disclaimer, the term of this patent is extended or adjusted under 35 U.S.C. 154(b) by 152 days.

(21) Appl. No.: 13/883,396

(22) PCT Filed: Nov. 8, 2011

(86) PCT No.: PCT/GB2011/052164
§ 371 (c)(1),
(2), (4) Date: May 3, 2013

(87) PCT Pub. No.: WO2012/069804
PCT Pub. Date: May 31, 2012

(65) Prior Publication Data
US 2013/0327193 A1 Dec. 12, 2013

(30) Foreign Application Priority Data
Nov. 22, 2010 (GB) .................................. 1019753.1

(51) Int. Cl.
*B26D 1/00* (2006.01)
*B26D 1/48* (2006.01)
*B65H 54/00* (2006.01)
*B25B 11/00* (2006.01)
*B26B 27/00* (2006.01)
*B26D 1/547* (2006.01)
*B60J 1/02* (2006.01)

(52) U.S. Cl.
CPC .............. *B65H 54/00* (2013.01); *B25B 11/007* (2013.01); *B26B 27/002* (2013.01); *B26D 1/547* (2013.01); *B60J 1/02* (2013.01); *Y10T 83/04* (2015.04)

(58) Field of Classification Search
USPC .................... 30/116; 83/200.1, 651.1, 13, 56; 29/559, 426.4; 254/278
See application file for complete search history.

(56) References Cited

U.S. PATENT DOCUMENTS

| 5,622,093 | A | 4/1997 | Hutchins | |
|---|---|---|---|---|
| 6,338,619 | B1 * | 1/2002 | Rusch | 425/11 |
| 7,270,357 | B1 * | 9/2007 | Liao | 294/65 |
| 7,618,023 | B2 | 11/2009 | Ericson | |
| 8,474,355 | B2 * | 7/2013 | Finck | 83/39 |
| 8,572,835 | B2 * | 11/2013 | Skluzak et al. | 29/559 |
| 2002/0121330 | A1 * | 9/2002 | Eriksson | 156/108 |
| 2007/0000361 | A1 * | 1/2007 | Ericson | 83/13 |
| 2008/0012349 | A1 * | 1/2008 | Finck | 292/70 |

(Continued)

FOREIGN PATENT DOCUMENTS

| EP | 2191943 | 6/2010 |
|---|---|---|
| WO | WO2006030212 | 3/2006 |

*Primary Examiner* — Omar Flores Sanchez
(74) *Attorney, Agent, or Firm* — Gordon & Jacobson, P.C.

(57) ABSTRACT

A winder unit is provided for use with cutting wire in cutting out a vehicle glazing panel. The winder unit includes first and second winder spools spaced apart from one another, where the winder spools are configured to wind the cutting wire. The winder unit further includes a suction mount for mounting the winder unit, wherein the suction mount comprises a single suction device only. And the winder unit further includes at least one wire guide element spaced from the winder spools, wherein the at least one wire guide element is mounted with respect to the winder unit so as to be adjustable in position or orientation with respect to at least one of the suction mount and the winder spools.

14 Claims, 2 Drawing Sheets

(56) References Cited

U.S. PATENT DOCUMENTS

| | | | |
|---|---|---|---|
| 2010/0132201 A1* | 6/2010 | Klabunde et al. | 30/277.4 |
| 2010/0132882 A1* | 6/2010 | Hess et al. | 156/250 |
| 2012/0222527 A1* | 9/2012 | Seebauer | 83/13 |
| 2012/0227896 A1* | 9/2012 | Clabunde | 156/193 |

* cited by examiner

APPARATUS AND METHOD FOR CUTTING OUT A VEHICLE GLAZING PANEL

CROSS-REFERENCE TO RELATED APPLICATIONS

This application claims priority from PCT/GB/2011/052164 filed on Nov. 8, 2011 and from GB 1019753.1, filed Nov. 22, 2010, which are hereby incorporated by reference in their entireties.

BACKGROUND OF THE INVENTION

1. Field of the Invention

The present invention relates to a vehicle glazing panel cut out apparatus and method.

The invention particularly relates to a technique using a cutting wire in order to effect release of the glazing panel, such as a windscreen, from its mounted position in the vehicle windscreen frame. The technique and cut-out tool of the present invention is also applicable to use on other bonded glazing panels.

2. State of the Art

Prior art is known which uses wire winder spools mounted on a single tool in order to effect cut out of a vehicle windscreen or side glass. Exemplary arrangements are disclosed in, for example U.S. Pat. No. 7,618,023 and WO2006030212.

An improved technique and apparatus have now been devised.

SUMMARY OF THE INVENTION

According to a first aspect, the present invention provides a winder unit for use with a cutting wire in cutting out a vehicle glazing panel, the winder unit having:

first and second spaced winder spools for winding cutting wire;

a suction mount for mounting the unit, wherein the suction mount comprises a single suction device only.

It is preferred that the first and second winder spools are spaced to be positioned one on either side of a diameter line of the suction mount.

Beneficially, the axes of the winder spools are positioned within a space defined by the projected diameter of the skirt/membrane of the sucker mount.

In a preferred embodiment, the winder spools are mounted to the suction mount at a position over the body of the suction device.

In one embodiment, it may be preferred that the winder spools are mounted on a common deck which is secured to the single suction device.

The foregoing technical features, either alone or in combination define an arrangement which is compact and efficient to use.

It is preferred that the unit includes at least one wire guide element (preferably a rotatable guide element—such as a pulley wheel) spaced from the spools.

Desirably, first and second wire guide elements are provided, a respective guide element being positioned outwardly of each of the winder spools.

In certain embodiments, it may be preferred that the wire guide element is mounted with respect to the unit so as to be adjustable in position or orientation with respect to the winder spools.

In such an arrangement, the wire guide element may be pivotably or tiltably mounted so as to pivot or tilt with respect to the winder spools.

It may be preferred that the unit is provided with a handle spaced from the winder spools. This ensures that the winder spools can be place close to one another, because the unit can be lifted at a handle positioned other than between the winder spools.

In one embodiment, the unit is provided with a pair of substantially parallel handles each to be gripped by a separate hand of an operator.

The, or each, handle may extend transversely to a line extending between the winder spools.

In one embodiment, it is preferred that the unit includes a pump actuated suction device. According to a further aspect, the present invention provides a method of removing a vehicle glazing panel (such as a windscreen or side glass) using a winder unit as defined herein.

The invention will now be further described, in a specific embodiment, by way of example only and with reference to the accompanying drawings.

DETAILED DESCRIPTION OF THE PREFERRED EMBODIMENTS

Figure 1:
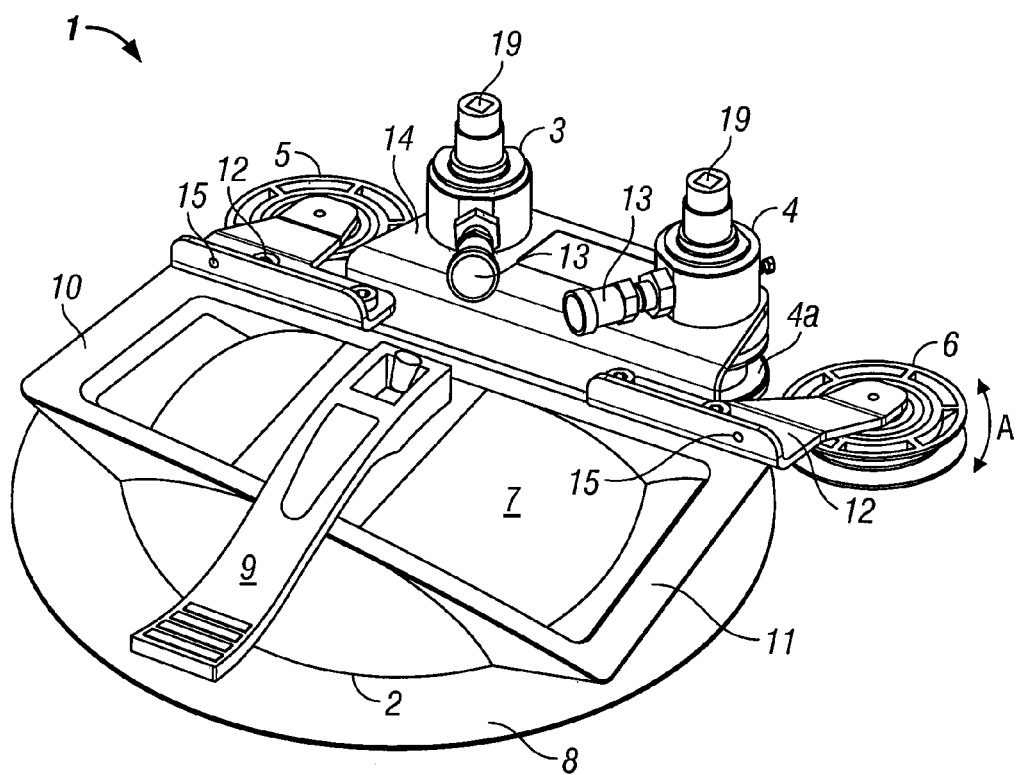
FIG. 1 is a schematic perspective view of apparatus in accordance with the invention.

Referring to the drawings, the cut out apparatus comprises a wire winder unit 1 which has a single suction mount 2. Mounted on-board the single suction mount 2 is a pair of spaced winder spools 3, 4 and pair of spaced rotatably mounted guide pulley wheels 5, 6. The single suction mount 2 enables the wire winder unit 1 to be releasably and securely mounted to the vehicle windscreen (typically on the inside of the vehicle). The winder spools 3, 4 are spaced to be positioned one on either side of a diameter line of the suction mount.

The suction mount 2 comprises a rigid plastics cup moulding 7 and an underlaying flexible rubber sucker membrane 8. The flexible rubber sucker membrane 8 extends beyond the periphery of the rigid plastics cup moulding 7 in order to enhance the suction capability of the suction mount 2. A suction device actuation/release lever side handle 9 enables consistent suction to be applied and released. As an alternative, it is possible that a pump actuated suction mount 2 could be employed such as disclosed in, for example, The suction mount 2 is formed to have integral spaced side handles 10, 11. The side handles 10, 11 extend substantially parallel to one another and in a direction transverse to the direction of spacing between the winder spools 3, 4.

The winder spools 3, 4 are provided on board a winder spool mounting deck 14 which is bolted to the suction mount 2. The deck 14 carries the pair of winding spools 3, 4 in side by side relationship such that the wire receiving reel 4a is underslung below the deck 14. The winder spools 3, 4 are connected to axial winding shafts which are supported in bearings provided on the deck 14. The winder spools 3, 4 are driven axially rotationally either manually via a hand winder or by means of a mechanical actuator such as a motorised winding or winching tool. Drive bosses 19 are provided with female sockets (square bores) for receiving the male driving tool. Positioned outwardly of the winding spools are respective wire guide pulley wheels 5, 6 of low friction plastics material. The pulley wheels are mounted to be rotatable about respective rotational axes. The guide pulleys rotate as the cutting wire is drawn tangentially across the pulleys as will be described. The winder spools 3, 4 are held to rotate in one direction only (each in opposite senses) by respective ratchet mechanisms 13. Each mechanism includes ratchet override permitting prior tightened wire to be slackened, or unwound (reverse wound) the ratchets can be overridden by pulling out the ratchet release knobs 13.

The guide pulley wheels 5, 6 are mounted to the rigid plastics cup moulding 7, by means of pulley wheel mounting arms 12, which are bolted to the rigid plastics cup moulding 7. In one embodiment, the guide pulley wheels 5, 6 are mounted by means of the pulley wheel mounting arms 12 in order that pulley wheel mounting arms 12 (and hence the guide pulley wheels 5, 6) can be tilted about a pivot 15 with respect to the suction mount 2 and the winder spool mounting deck 14. This enables the position of guide pulley wheels 5, 6 to self align (tilt in direction of arrow A in figure wire winder unit 1) and provide a self adjustment as a result of windscreen glass curvature.

Figure 2:
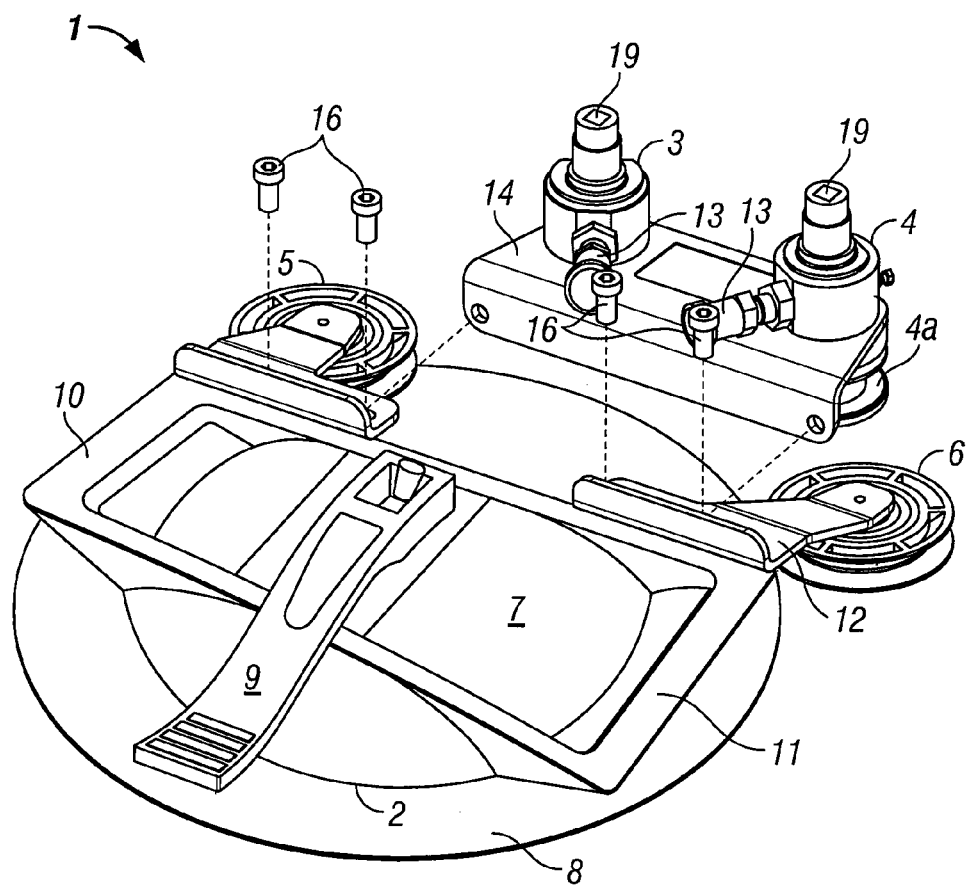
FIG. 2 is a schematic perspective exploded view of the apparatus similar to the apparatus of FIG. 1.

In the embodiment shown in FIG. 2, a pair of mounting bolts 16 are used to secure the pulley wheel mounting arms 12 to the rigid plastics cup moulding 7. In such an embodiment the pulley wheel mounting arms 12 do not pivot or tilt and accordingly, the guide pulley wheels 5, 6 remain fixed (apart from being rotatable) with respect to the winder spool mounting deck 14.

In use, the arrangement can be used in a generally similar manner to the winder unit described in FIGS. 9 to 1 of WO2006030212. Initially a flexible cutting wire is looped around the outside of a windscreen glazing panel to lie peripherally adjacent the bonding bead (typically a polyurethane bonding bead) which is sandwiched between the glazing panel and the support frame of the vehicle. Opposed ends of the cutting wire are fed through a pierced channel made through the bonding bead and the free ends are then each wound around a separate winder spool of the winder unit.

The glazing panel can as such be removed using a wire and the winder unit 1 only (no additional guide is required). In this technique the winder unit is initially secured to the steering wheel side of the glazing panel, positioned above the steering wheel. With the winder unit 1 in position as described, the cutting wire is looped around the outside of the windscreen to lie peripherally adjacent the bonding bead which is sandwiched between the glazing panel and the support frame of the vehicle. Opposed ends of the cutting wire are fed through a pierced channel made through the bonding bead in the corner of the windscreen below the position of the winder unit.

A length of the wire is pulled through to the interior of the vehicle and passed around pulley guide wheel 6 and secured to the reel 3a of winder spool 3 of the winder unit. A free end length of wire is pulled through, being of length sufficient to reach the upper left hand corner of the glazing panel. Winder spool 3 is then operated to cause the wire length to cut through the bonding bead upwardly along the side of the windscreen, until the cut line has passed around the upper right hand corner of the screen. At this juncture, the unit is removed from the screen and repositioned on the glazing panel in the upper left hand corner.

Prior to repositioning the winder unit 1, the ratchet of winder spool is released by means of the release knob 13 to permit the wire to be wound out from the winder spool 3 as it is moved across the glazing panel to be repositioned. The ratchet is subsequently re-engaged and spool 3 once again operated to wind in the wire.

Next the unit is moved around the corner of the glazing panel and through substantially a right angle, where it is secured to the glazing panel. In order to enable this to be achieved, the ratchet of spool 3 is again released and subsequently re-engaged. The end of the free length of wire is then wound around pulley 5 and connected to winder spool 4 and the spools operated either sequentially (or simultaneously) to complete the cut. The lengths of wire cross in order to complete the cut.

An important improvement over the prior art is that a single suction mount 2 only is used and that the pair of winder spools 3, 4 are mounted on board the single suction mount 2. The axes of the winder spools are positioned within a space defined by the projected diameter of the skirt of the sucker mount (that is the diameter of the sucker membrane 8 extends laterally beyond the position of the winder spool axes). This means that the space taken up on the windscreen by the wire winder unit 1 is reduced and also a single actuation only of the suction mount 2 is required, saving time and effort.

By mounting the pair of winder spools 3, 4 directly over the flexible rubber sucker membrane 8 of the suction mount 2, a suction mount 2 of large enough diameter to produce sufficient suction force can be used. In using the prior art apparatus as shown in, there is a risk that if one of the pair of spaced suction cups is not fully energised, the other has sufficient suction to hold the winder unit fixed in position when the wire is not under tension, but fails when the wire is tensioned during the winding process.

The invention claimed is:

1. A winder unit for use with cutting wire in cutting out a vehicle glazing panel, the winder unit having:
   first and second winder spools spaced apart from one another, the winder spools configured to wind the cutting wire;
   a suction mount for mounting the unit, wherein the suction mount comprises a single suction device only; and
   at least one wire guide element spaced from the winder spools, wherein the at least one wire guide element is mounted with respect to the winder unit so as to be adjustable in position or orientation with respect to at least one of the suction mount and the winder spools.

2. A winder unit according to claim 1, wherein:
   the first and second winder spools are spaced on either side of a diameter line of the suction mount.

3. A winder unit according to claim 1, wherein:
   the winder spools are mounted to the suction mount at a position over the body of the single suction device.

4. A winder unit according to claim 3, wherein:
   the winder spools are mounted on a common deck which is secured to the single suction device.

5. A winder unit according to claim 1, wherein:
   the at least one wire guide element is rotatable.

6. A winder unit according to claim 1, wherein:
   the at least one wire guide element comprises a pulley wheel.

7. A winder unit according to claim 1, wherein:
   the at least one wire guide element comprises first and second wire guide elements positioned outwardly of each of the winder spools.

8. A winder unit according to claim 1, wherein:
   the at least one wire guide element is configured to pivot or tilt with respect to at least one of the suction mount and the winder spools.

9. A winder unit according to claim 1, further comprising:
   a handle spaced from the winder spools.

10. A winder unit according to claim 1, further comprising:
   a pair of handles each to be gripped by a separate hand of an operator.

11. A winder unit according to claim 1, further comprising:
an elongate a handle extending transversely to a line extending between the winder spools.

12. A winder unit according to claim 1, wherein:
the single suction device is actuated by a pump.

13. A winder unit according to claim 1, wherein:
the axes of the winder spools are positioned within a space defined by the projected diameter of the single suction device.

14. A method of removing a vehicle glazing panel comprising:
providing a winder unit according to claim 1; and
using the winder unit to wind cutting wire in conjunction with cutting out the vehicle glazing panel.

\* \* \* \* \*